United States Patent [19]

Gunawardena

[11] Patent Number: 5,253,567
[45] Date of Patent: Oct. 19, 1993

[54] THERMAL FLUID HEAT EXCHANGER FOR DEEP FAT FRYER

[75] Inventor: Ramesh M. Gunawardena, Solon, Ohio

[73] Assignee: Stein, Inc., Sandusky, Ohio

[21] Appl. No.: 26,610

[22] Filed: Mar. 5, 1993

[51] Int. Cl.⁵ .................. A47J 27/00; A47J 37/00; A47J 37/12
[52] U.S. Cl. .................. 99/404; 99/330; 99/408; 126/378; 126/391; 165/108
[58] Field of Search .................. 99/403-408, 99/330, 331, 326, 447; 126/390-392, 376-378, 360 R, 343.5 A; 165/108, 120

[56] References Cited

U.S. PATENT DOCUMENTS

| | | | |
|---|---|---|---|
| 1,234,131 | 7/1917 | Cleveland | 99/2 |
| 1,760,979 | 6/1930 | Ferry . | |
| 2,546,163 | 3/1951 | McBeth | 99/408 |
| 2,833,203 | 5/1958 | Benson et al. | 99/404 |
| 3,309,981 | 3/1967 | Benson et al. | 99/405 |
| 3,313,288 | 4/1967 | Aho | 126/391 |
| 3,376,806 | 4/1968 | Magnusson | 99/408 |
| 3,603,101 | 9/1971 | Sullivan | 165/108 |
| 3,603,243 | 9/1971 | Foster | 165/120 |
| 3,688,683 | 9/1972 | Boggs | 99/330 |
| 3,733,202 | 5/1973 | Marmor | 99/1 |
| 3,757,672 | 9/1973 | Szabrak et al. | 99/404 |
| 3,761,290 | 9/1973 | Brunner | 99/408 X |
| 3,824,917 | 7/1974 | Kawahara et al. | 99/404 |
| 4,091,801 | 5/1978 | Lazaridis et al. | 126/378 |
| 4,187,771 | 2/1980 | Westover et al. | 99/404 |
| 4,366,749 | 1/1983 | Caridis et al. | 99/339 |
| 4,478,140 | 10/1984 | Bullock | 99/404 |
| 4,491,602 | 1/1985 | Miller | 426/438 |
| 4,574,183 | 3/1986 | Knauss | 99/403 |
| 4,584,931 | 4/1986 | Feehan | 99/355 |
| 4,628,804 | 12/1986 | Belshaw et al. | 99/404 |
| 4,690,127 | 9/1987 | Sank | 126/391 |
| 4,694,743 | 9/1987 | Groff | 99/407 |
| 4,706,557 | 11/1987 | Feng et al. | 99/355 |
| 4,744,293 | 5/1988 | Shimokawa | 99/404 |
| 4,852,475 | 8/1989 | Yang | 99/404 |
| 4,913,042 | 4/1990 | Miller | 99/404 |
| 5,074,199 | 12/1991 | Miller | 99/404 |

FOREIGN PATENT DOCUMENTS 9103973 4/1991 PCT Int'l Appl. .................. 99/404

Primary Examiner—Timothy F. Simone
Attorney, Agent, or Firm—Oldham, Oldham, & Wilson Co.

[57] ABSTRACT

The invention relates to a thermal fluid fryer which essentially contains an oil-filled cooking channel disposed within a fryer tank support frame, in which the product to be fried is conveyed through the channel on a continuous food conveyor belt. The oil is heated indirectly by at least one heat-exchanger unit disposed substantially vertically in the channel. The heat-exchanger unit has an inlet manifold and an exit manifold, wherein a thermal fluid enters the heat-exchanger unit at the inlet manifold and exits through the exit manifold. The thermal fluid is heated to a higher temperature than the surrounding oil, and imparts its thermal energy to it efficiently by means of the heat exchanger unit. In this configuration, the temperature range distribution of the fryer oil inside the fryer vat is minimized from side to side and along the length thereof.

10 Claims, 3 Drawing Sheets

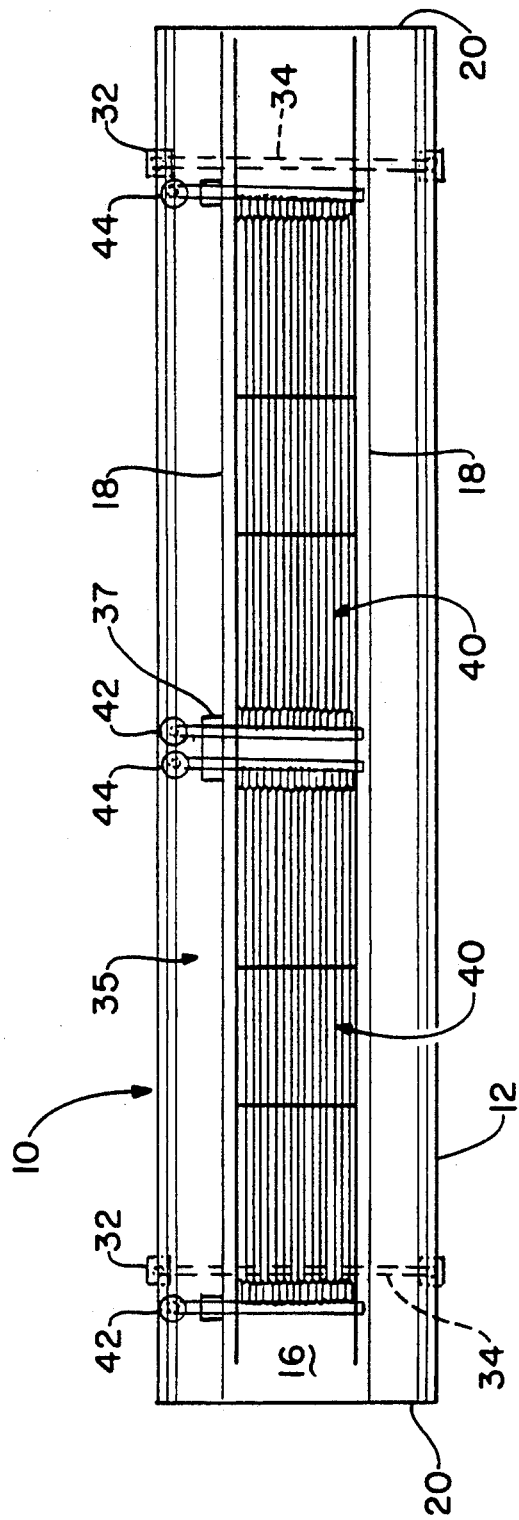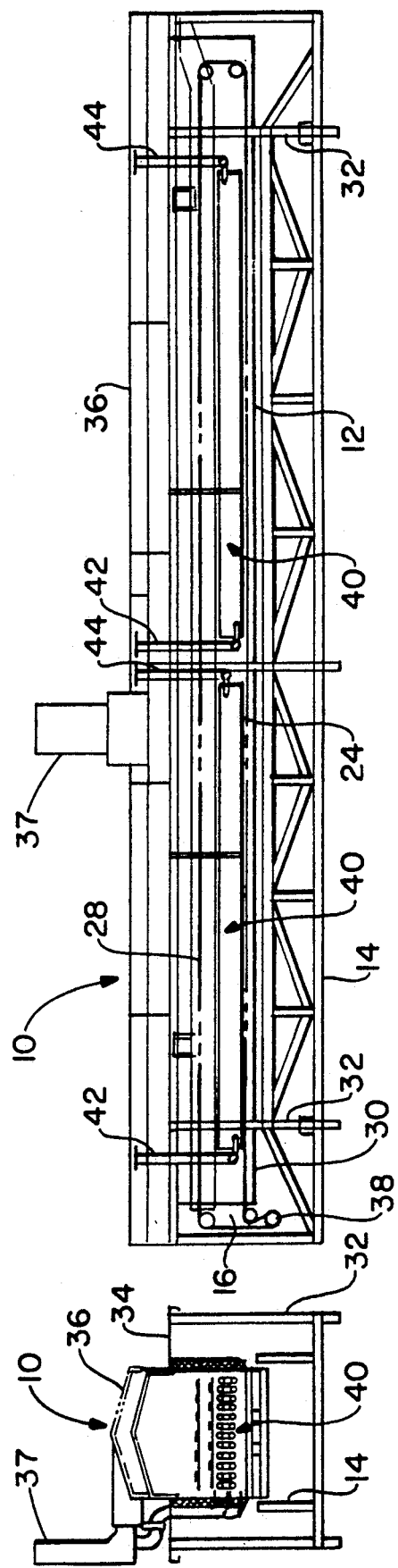

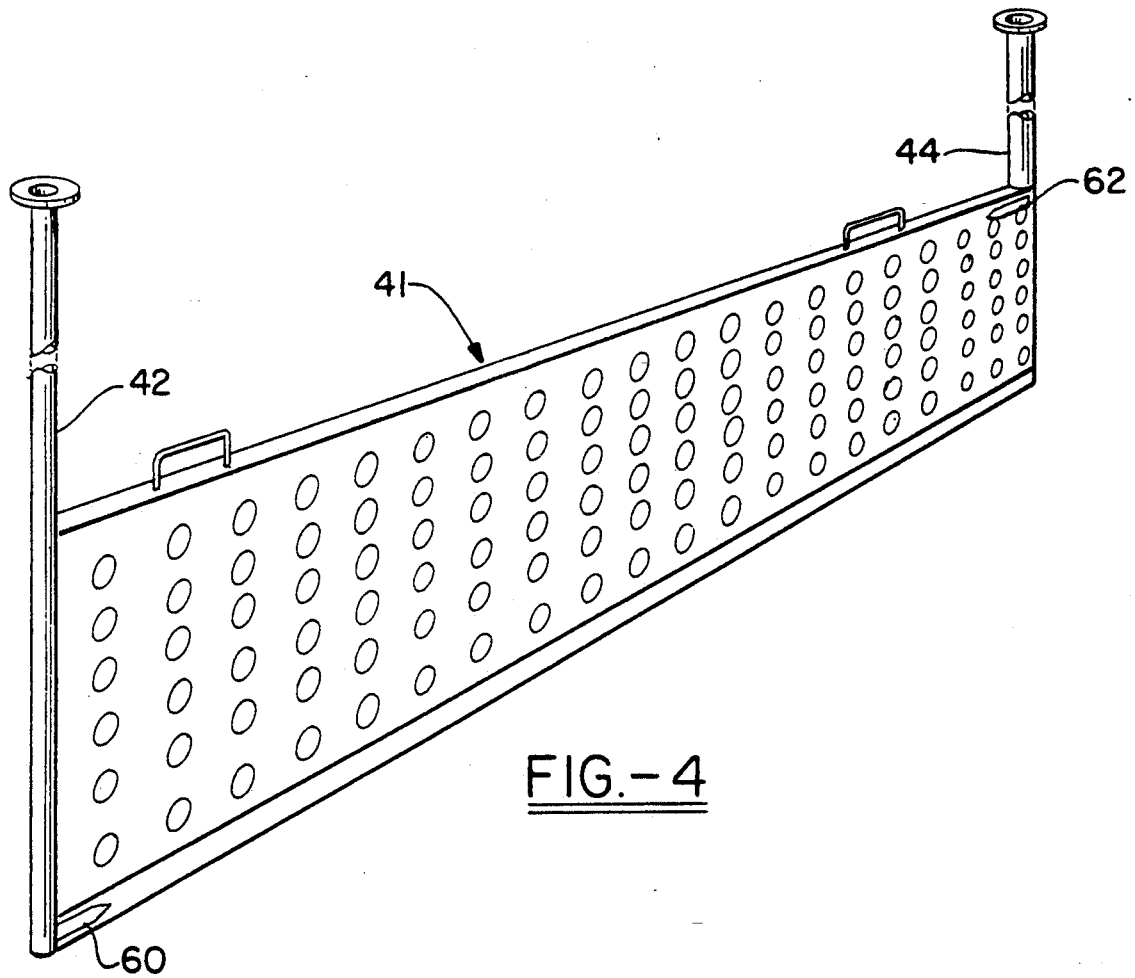

THERMAL FLUID HEAT EXCHANGER FOR DEEP FAT FRYER

TECHNICAL FIELD

This invention relates generally to the utilization of a thermal fluid heat exchanger and circulation system for use in a deep fat fryer for the continuous deep fat frying of large quantities of food products in a large scale food processing system.

BACKGROUND OF THE INVENTION

In conventional deep fat fryers, there has been utilized heating units of the direct-fired type, which are adapted to heat a cooking oil in the fryer by direct firing of combustible gases into heating tubes running through the bath from jet burner tubes associated with the fryer. The direct-fired heating units and the heating tubes thereof are conventionally positioned in parallel relationship running from side-to-side in the deep fat reservoir, with the jet burner tubes positioned at an open end of each of the tubes to introduce a combustible gas which is made to burn throughout the length of each of the heating tubes to heat the oil to a selected temperature. It should be recognized that with the direct-fired type of heating unit, uniformity of temperature within each of the heating tubes is difficult to maintain, resulting in non-uniformity of the heated cooking oil within the deep fat fryer. The cooking oil will become hotter adjacent the flame and of the burner tubes, and becomes progressively relatively cooler toward the opposite or flue end of the burner tube. The non-uniform heating of the frying oil will result in non-uniform frying of the food products within the fryer, and has also been found to result in turbulence within the fat reservoir which is undesirable.

As an alternative, indirect type of heating units have been developed, which comprise radiator-type units submerged in the cooking oil of the fryer. The radiator-type units normally include a plurality of tubing loops which carry a hot, pressurized, circulating heating fluid which is heated at a source remote from the fryer. In this manner, the heating fluid is brought to a predetermined temperature, and thereby raises the radiator-type heating unit submerged in the deep fat bath to a temperature close to that predetermined temperature. The indirect type of heating unit has been found to yield better uniformity of cooking oil temperatures within the fryer, but has resulted in various additional problems. As such deep fat fryers are typically used for frying of foods such as breaded poultry, breaded fish and shrimp, meat in a batter or breaded form, potato chips, tortilla chips, and the like, from which food particles such as batter, bread, meat, and like debris is loosened, such debris falls through the hot fat bath onto the array of heating units within the bath. Such food products will tend to adhere to the array of heating units in both the direct and indirect types of heating units, and cause significant problems in cleaning and maintaining the fryer apparatus.

Additionally, the indirect type of heating unit has also been found to not provide a substantially uniform temperature distribution within the hot oil bath, as the heating fluid introduced to the array of tubing loops associated with the radiator-type units submerged within the deep fat bath will cool as it is circulated therethrough. Alternatively, a circulation system associated with the radiator-type units will experience a large pressure drop from the infeed end of the tubing loops to the outlet end thereof. The pumping requirements associated with such systems must therefore be of quite large capacity to ensure that the heating fluid is adequately circulated through the plurality of tubing loops. Such indirect type of heating systems have also been found to not provide efficient heat transfer from the heating fluid to the surrounding oil bath, and the heating fluid directed into the radiator-type units must therefore be raised to a significantly higher temperature to ensure heating of the hot oil bath to a desired temperature.

SUMMARY OF THE INVENTION

Based upon the foregoing, there has been found a need to provide a better means for heating of cooking oil within deep fat fryers, to provide more uniform heat distribution within the hot oil bath, and wherein heating of the hot oil bath may be performed efficiently and economically. It is therefore a main object of the invention to provide a deep fat fryer having an improved means for heating the oil bath within the fryer, while overcoming the disadvantages of prior art systems.

The invention provides a deep fat fryer for the frying of large quantities of food products which comprises a housing for containing a bath of hot cooking oil through which food products are passed for frying thereof. The apparatus includes means for conveying food products from an infeed end to a discharge end of the housing, being supported within the housing and adapted to pass through the bath of hot cooking oil for frying of the food products thereon. At least one heat exchanger unit is positioned within the housing and immersed within the hot oil bath for heating of the oil to a predetermined temperature. In general, the heat exchanger units comprise at least two substantially vertically disposed sheet members which form at least one flow channel therebetween. A thermal fluid is passed through the at least one flow channel for heating of the sheet members, which act as heat transfer surfaces for heating of the oil within the housing. The system further includes a thermal fluid circulation system coupled to each of the plurality of heating units for providing a substantially uniform volume of the thermal fluid through the flow channel of each heating unit. The thermal fluid circulation system includes means for heating the thermal fluid to a predetermined temperature, wherein the arrangement will provide a substantially uniform temperature oil bath within the housing as desired.

BRIEF DESCRIPTION OF THE DRAWINGS

FIG. 1 shows a partially cutaway side elevation view of the deep fat fryer of the invention;

FIG. 2 shows a partial section side elevational view of the fryer apparatus;

FIG. 3 shows an enlarged side elevational view in partial section, which more distinctly shows the heat exchanger units of the apparatus;

FIG. 4 shows a partial cutaway perspective view of a single heat exchange unit associated with the apparatus;

DETAILED DESCRIPTION OF THE INVENTION

Figure 5:
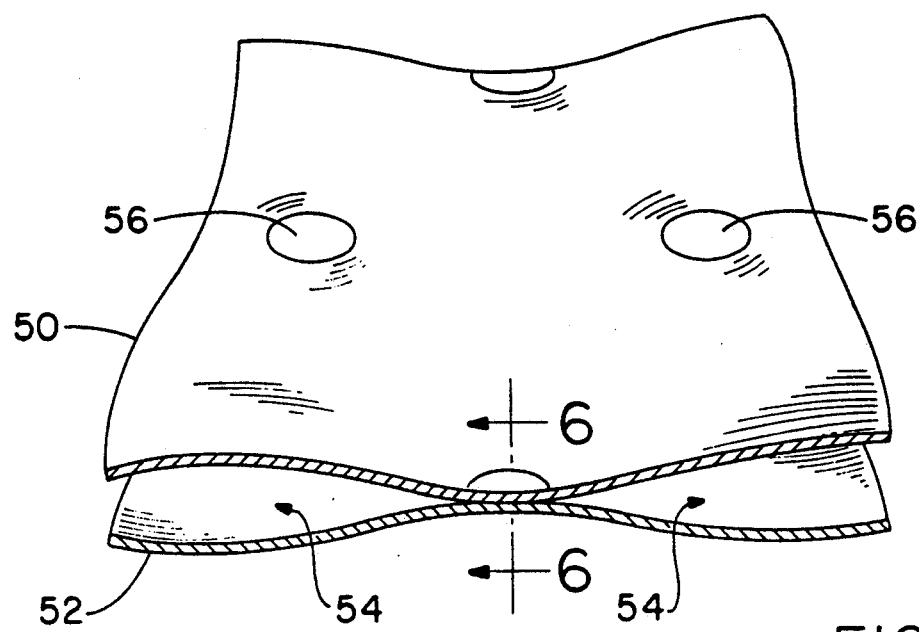
FIG. 5 shows a partial perspective view of the heat exchanger unit shown in FIG. 4 in cutaway.

Turning now to the Figures, a preferred embodiment of the deep fat fryer in accordance with the invention will be described. As illustrated in FIGS. 1–3, the fryer apparatus 10 includes a housing 12 which is supported by a support frame 14. The housing 12 generally forms an elongated horizontal reservoir and defines a cooking channel 16. The cooking channel 16 is defined by front and rear walls 20, side walls 18, and bottom panel 30, and will hold an volume of cooking liquid or oil 26. Mounted near the four corners of the fryer apparatus 10 are four generally vertically oriented jacks 32, which are preferably hydraulic and have vertically extending piston rods which are connected at their upper ends to a crossbar 34 extending between respective jacks 32. Mounted on crossbars 34 is an elongated hood member 36 mounted above the elongated housing 12. In conjunction with the hydraulic jacks 32, the hood member 36 is movable between closed and opened positions, wherein in the closed position a cooking operation is performed, and in an opened position cleaning of the fryer apparatus 10 can be performed. The housing 12 also has an exhaust or vent area 35 having a steam vent 37 associated therewith for exhausting gases produced in the frying operation.

The fryer apparatus 10 further includes a main food conveyor run 28 positioned within cooking channel 16, on which food products to be immersed within the cooking oil in the reservoir defined by housing 12 will be positioned. Also, within the cooking channel 16 is a sediment conveyor run 24 which travels along a bottom portion of the cooking channel 16 to catch and facilitate removal of sediments comprising food particles which have fallen from food products and have sunk to the bottom of the cooking oil within the reservoir. These types of sediment materials are removed from the fryer 10 by means of a discharge auger 38 positioned at the discharge end of the sediment conveyor run 24. The main and sediment conveyor runs 28 and 24 respectively, may be formed from an endless conveyor belt constructed of a wire mesh and driven by conventional means such as a chain drive, hydraulic system, or the like. Although not shown in its open configuration, the hood member 36 is extendable by means of the jacks 32 to an upraised position which allows access to the interior of the fryer for cleaning, maintenance, or other functions. The hood member 36 meets with an extending sleeve portion associated with housing 12 to enable the cooking channel 16 to be fully enclosed for cooking operations, for safety and efficiency of operation. In this regard, there may be provided sensors associated with the housing 12 and/or hood member 36, which in conjunction with an electronic control system (not shown) will indicate whether the hood 36 is in a closed position to enable operation of the apparatus, or whether hood 36 is opened which will render the apparatus inoperative for safety purposes. Other sensors associated with the apparatus may include a low oil level sensor and temperature sensors to allow precise control of temperature of the cooking oil throughout the cooking cycle within the apparatus. Additional safety features associated with the apparatus may comprise high temperature cutoff or limiting switches flame sensors or the like which will automatically shut down operation of the apparatus upon the occurrence of unsafe conditions in its operation. An electronic control system may be used to control all of the various aspects of operation of the fryer apparatus accordingly.

Of particular importance in the fryer apparatus 10, is a unique heat exchanger for indirect heating of the cooking oil within the reservoir of housing 12. As mentioned previously, the prior art has utilized heating units of the indirect heating type, which comprise piping units submerged in the deep fat bath of the fryer. These systems are formed as a plurality of tubing loops which carry hot pressurized, circulating heating liquids which are heated at a remote source from the fryer. The indirect type of heating units have various disadvantages as mentioned previously, and the invention therefore utilizes a different type of heating unit to accomplish more uniform heating of the cooking oil within the apparatus as well as providing a variety of other benefits. The fryer apparatus 10 includes the use of at least one indirectly heated heat exchanger in conjunction with a thermal fluid, wherein the heat exchanger is provided as a substantially vertically extending heat transfer plate having at least two heat transfer sheets positioned and secured relative to one another to define a flow channel therebetween. In the preferred embodiment, a bank of heat exchanger plates is utilized to minimize the temperature gradient from the infeed end to the discharge end of the fryer as well as across the width thereof. Within the cooking channel 16, the bank of heat exchangers is generally indicated at 40. In the embodiment of the apparatus as shown in FIGS. 1–3, two banks of heat exchanger units 40 are provided in separate zones of the cooking channel 16 so as to extend along the length of the apparatus 10. In the preferred form the housing 12 will be substantially elongated to allow a significant dwell time of food products within the hot cooking oil to achieve desired frying characteristics, while enabling a large amount of food product to be continuously introduced into the apparatus in a large scale food production process. The separate zones within the apparatus provide highly uniform temperatures within the apparatus to ensure uniformity and repeatability of cooking operations and increase efficiency in operation of the apparatus. As seen in FIG. 1, the bank or banks of heat exchangers 40 may be positioned below the main food conveyor run 28 and above the sediment conveyor run 24 to provide uniform heating of the cooking oil within the reservoir of housing 12.

Each heat-exchanger plate bank 40, having a plurality of individual heat exchanger 41 plates, has a thermal fluid inlet manifold 42 on one extremity and a second thermal fluid outlet manifold 44 at its opposing extremity. The inlet and outlet manifolds 42 and 44 are coupled to each of the heat exchangers plates 41 to uniformly introduce a thermal fluid to each. While not shown in the preferred embodiment, it is possible to couple the thermal fluid flow with the two banks of heat-exchanger plates in the separate zones of the fryer, and the particular length of the fryer 10 and heating requirements will dictate whether more than one heat exchanger or banks of heat exchangers are necessary.

Figure 6:
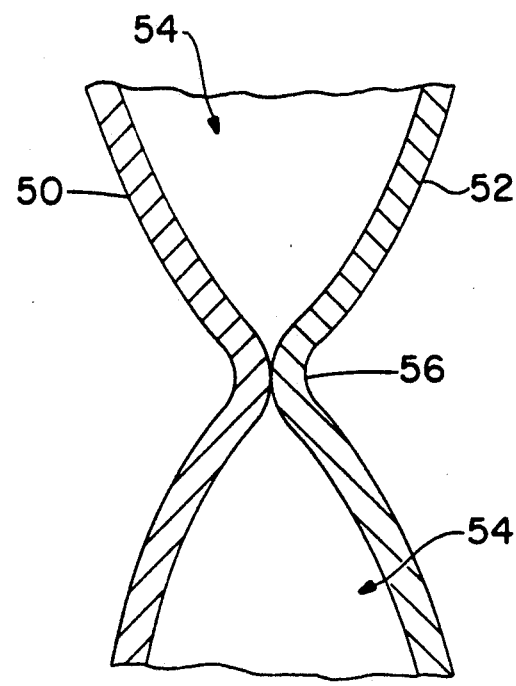
FIG. 6 shows a partial cross-sectional view taken along line 6—6 of FIG. 5.

In FIGS. 4–6, the design of the heat-exchanger plates is portrayed in greater detail. The heat exchanger plates 41 within the banks 40 typically comprise at least two sheets 50 and 52 which are secured together to form a pressurized vessel, and may employ a double embossed design which has inflated zones on both sides. In this manner, a plurality of pockets 54 are formed with flow passages therebetween, which together form a restricted flow channel between the sheets 50 and 52. The sheets are sealed about their edges to form a high pressure heat transfer plate, and suitable plates are manufactured by the Paul Mueller Company, Springfield, Mo. This design maximizes the heat transfer process by efficiently utilizing both sides, 50 and 52, of the heat exchange unit. The sheets 50 and 52 may be welded together at a plurality of locations such as shown at 56 by resistance spot welding, and thereafter inflated in the double embossed design. The thickness of the heat transfer sheets 50, 52 can be the same, which is the typical case, or they may be different. The material of construction is usually stainless steel, although other alloys and carbon steel, are equally possible. Stainless steel is generally preferred for ease of cleaning and appearance purposes, and can be electroplated for a polished finish. While a double embossed surface has been described, a single embossed surface, inflated on only one side, or other suitable configurations, are contemplated in the instant invention. It is also envisioned that combinations of single and double embossed surface designs could be used in the invention.

The heat-exchanger plates 41 are generally vertically oriented and spaced throughout the cooking channel 16 and connected at each end by an inlet manifold 42 and an exit manifold 44 respectively. The vertical orientation and spacing permits facile cleaning in that bread crumbs or food particles which fall off the food product have a clear path to the sediment conveyor 24 and discharging auger 38. The plurality of vertically spaced plates in the preferred embodiment produce The plurality of vertically spaced plates in the preferred embodiment produce better heat transfer, to the cooking oil by means of the additional surface area which is exposed to the cooking oil 26. This configuration promotes particularly uniform temperature distribution across the length and width of cooking channel 16, which has not been obtained in prior art methods. Although there is no maximum length for any one heat-exchanger bank 40, it is advantageous to keep the length compatible with lower cost pumping requirements of a thermal fluid circulation system.

The heat-exchanger plates 41 are supplied with a thermal fluid through use of a circulation system comprising a continuous recycle system. In the preferred embodiment, the recirculation system circulates approximately 4 gallons per minute through each individual heat exchanger 41, with approximately 160 gallons per minute circulating through a bank of plates 40. These volumes of flow of thermal fluid through the heat exchanger banks have been found to yield uniform cooking oil temperatures throughout the cooking channel 16 for large scale frying applications. There is no upper or lower limit on the circulation rate, except of course, the length of the heat exchanger units and the heat duty requirements of a particular application will dictate particular flow and pumping requirements. In the preferred embodiment, the heat exchanger bank plates 40 have the inlet manifolds 42 configured to introduce thermal fluid to each of the individual heat exchangers in the banks from the bottom of the heat exchangers as shown in FIG. 4 at 60. Conversely, the outlet manifold 44 for each individual heat exchanger is positioned at the top as shown at 62, to allow the thermal fluid introduced to the heat exchanger to exit at a top portion thereof. In this manner, thermal fluid introduced to each heat exchanger 41 will distribute evenly across the heat transfer surfaces thereof, which are arranged in a substantially vertical plane. In the heat exchanger plate bank 40, the inlet and outlet manifolds are designed to evenly distribute thermal fluid to each of the individual heat exchanger units 41 within the banks 40. As each of the individual heat exchanger units 41 has a restricted flow channel through which thermal fluid will pass when introduced thereto, it has been found that a significantly lower pressure drop is experienced in the circulation of the thermal fluid through the heat exchanger plate banks 40 as compared to prior art indirect heated radiator units.

In general, at the preferred circulation rates, a pressure drop of one psi is experienced at the entry of the inlet manifold 42, with only a pressure drop of approximately five psi occurring through the bank of heat exchangers. This low pressure drop is aided by the single pass configuration of the heat exchanger units 41 and the restricted flow passage through each unit. In this manner a recirculating pump (not shown) associated with the recirculation system can be approximately sized to accommodate the desired flow rates taking into account the low pressure drop experienced by the system. As no significant pressure drop will occur, the size of the pump for a particular desired flow rate can be substantially less than that formerly required with indirect types of heating units. While a single pass configuration is generally preferred, other flow patterns, such as serpentine, or quilted are envisioned to be used for some applications.

The heat-exchanger plates can accommodate any type of thermal fluid, such as steam or an appropriate transfer liquid such as oil. The choice between the two is generally dependent upon the pressure available at the installation location. Simple engineering calculations, known in the art, will quickly determine the appropriate number of plates within any one bank when the heat-exchanger medium is selected and the heating requirements of the system have been determined. In general, steam provides better heat transfer, but also requires higher site pressures over a liquid medium. The design of the heat exchanger banks 40 accommodates low cooking oil volume within the fryer tank relative to other conventional indirectly heated fryer designs. This aspect of the invention is particularly important for large scale food processing applications, where cooking oil turnover is a major cost and is therefore of significant concern. Poor oil turnover raises the level of free-fatty acids which degrades the oil, resulting in the possible need to discard the oil thereby adding significant costs to replace the cooking oil. A lower volume of cooking oil will in part help to reduce costs associated with oil turnover. Further, during the cooking process, food particles such as batter, bread, meat, etc., fall from food products introduced to the fryer, and if not efficiently removed may add to the degradation of cooking oil within the fryer. In prior art systems, food particles which fall from food introduced to the fryer may have fallen onto the heating units within the fryer, wherein contact with such heating units would cause burning or charring thereof. Unless removed, the burned food particles will contribute to decomposition of the cooking oil, resulting in clogging of the system and possibly producing an unpleasant tasting food product from the frying operation. As the heat exchanger units 41 in the present system are disposed in a substantially vertical orientation, food particles are able to readily fall through the heat exchanger units 41 to be removed by the sediment conveyor as previously described. The food particles will thus not readily contact the heat exchanger units 41 and problems associated with burning or charring of such particles will be greatly reduced. This in turn will also contribute to reduction of oil loss in operation of the fryer.

It has further been found that unlike previous indirectly heated fryers, the heat-exchanger concept minimizes the exposure of the cooking oil to high temperatures which contribute to oil degradation. In the instant invention, the heat-exchanger medium is subjected to the higher heat, not the cooking oil. Further, due to the high surface area of the heat-exchanger plates, the temperature of the heat-exchanger medium need only be slightly above that of the temperature desired for the cooking operation. In this manner, the temperatures to which the thermal fluid must be raised can be significantly lower than previously needed to heat the cooking oil to a desired temperature for operation. Additionally, the temperature of the thermal fluid will be substantially uniform along the heat exchanger units 41 due to the restricted passage formed therein and the low pressure drop, such that the cooking oil will be exposed to uniform temperatures throughout the apparatus. The increased heat transfer performance of the heat exchanger units 41 allows more efficient and economical operation of the fryer accordingly.

From the foregoing, it is seen that the fryer apparatus of the invention, using the substantially vertically oriented heat transfer surfaces of one or more heat transfer units will improve cleanability of the apparatus and reduce the amount of falling food particles adhering to the surfaces of the heat exchanger units. The plate type design of the individual heat exchanger units provides a significantly increased heat transfer area per unit volume of introduced thermal fluid. The parallel flow of thermal fluid to the individual heat exchanger units provides even distribution of thermal fluid flow to each of the individual units within a bank of units, and thereby allows optimized temperature control across the width of the fryer. Further, the parallel flow of thermal fluid within a bank of heat exchanger units and low pressure drop in the recirculation system will allow uniform temperatures to be obtained throughout the length of the fryer and will reduce the pump head requirements. Although preferred embodiments of the invention have been described herein, various modifications or variations will be apparent to one skilled in the art without departing from the principles and teachings herein. Accordingly, the invention is not to be limited to the specific embodiments illustrated, but is only intended to be limited by the scope of the appended claims.

What is claimed is:

1. A deep fat fryer for the frying of large quantities of food products comprising;
   a housing for containing a bath of hot cooking oil;
   means for conveying food products from an infeed end to a discharge end of said housing, said means for conveying being supported within said housing and adapted to pass through said bath of hot cooking oil for frying of said food products;
   at least one heat exchanger unit positioned within said housing and immersed in said bath for heating of said oils to a predetermined temperature, said at least one heat exchanger unit comprising at least two substantially vertically disposed sheet members forming at least one flow channel therebetween through which a thermal fluid is passed for heating of said plates, said plates acting as heat transfer surfaces for heating of said oil within said housing to a substantially uniform temperature; and
   a thermal fluid circulation system coupled to said at least one heat exchanger unit for providing a substantially uniform volume of thermal fluid through said at least one flow channel, and including means for heating said thermal fluid to a predetermined temperature.

2. The fryer of claim 1, wherein,
   a plurality of said heat exchanger units are positioned within said housing and said thermal fluid circulation system supplies each of said plurality of heat exchanger units with said substantially uniform volume of thermal fluid.

3. The fryer of claim 1, wherein,
   said means for conveying food products within said housing comprises a main food conveyor run and a sediment conveyor run, wherein said main food product conveyor run is positioned above said at least one heat exchanger unit, and said sediment conveyor run is adapted to travel along a bottom portion of said housing for removal of sediments from said bath of cooking oil.

4. The fryer of claim 1, wherein,
   a plurality of heat exchanger units are positioned within said housing and are coupled to one another by an inlet manifold which supplies said plurality of heat exchanger units with said thermal fluid, and an outlet manifold through which said thermal fluid exits said plurality of heat exchanger units.

5. The fryer of claim 4, wherein,
   said inlet manifold introduces said thermal fluid into said plurality of heat exchanger units at a bottom portion thereof, and said outlet manifold allows said thermal fluid to exit said heat exchanger units at a top portion thereof.

6. The fryer of claim 1, wherein,
   said at least one flow channel is a restricted passage between said at least two sheet members which allows thermal fluid introduced into said flow channel to be distributed evenly therein.

7. The fryer of claim 1, wherein,
   a plurality of said heat exchanger units is provided within said housing, said plurality being substantially evenly spaced across the width of a cooking channel defined by said housing.

8. The fryer of claim 1, wherein,
   said thermal fluid is a thermal oil.

9. The fryer of claim 1, wherein,
   said thermal fluid is a steam medium.

10. An indirectly heated thermal fluid fryer comprising:
    (a) a cooking channel disposed within a fryer tank support frame, the channel containing a cooking oil to be used in frying a food product which is conveyed through the channel within the cooking oil on a food conveyor belt;
    (b) at least one vertical heat-exchanger plate disposed within the cooking channel and submerged in the cooking oil, said at least one heat-exchanger plate having an inlet manifold and an exit manifold; and
    (c) a heat-exchanger fluid introduced to the at least one heat-exchanger plate at the inlet manifold and exiting through the exit manifold, the heat-exchanger fluid being of a higher temperature than the surrounding oil to heat the oil to a predetermined temperature within the cooking channel.

* * * * *